(12) United States Patent
Kuster et al.

(10) Patent No.: US 9,546,717 B2
(45) Date of Patent: Jan. 17, 2017

(54) BALL SCREW

(71) Applicant: SFS intec Holding AG, Heerbrugg (CH)

(72) Inventors: Hanspeter Kuster, Balgach (CH); Kurt Husistein, Burg (CH); Markus Schonenberger, Kirchberg (CH); Patrick Renhard, Gotis (AT); Ivo Rupper, Diepoldsau (CH); Markus Lichtensteiger, Montlingen (CH); Pascal Hutter, Diepoldsau (CH)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 14/888,806

(22) PCT Filed: May 13, 2014

(86) PCT No.: PCT/EP2014/059683
§ 371 (c)(1),
(2) Date: Nov. 3, 2015

(87) PCT Pub. No.: WO2014/184154
PCT Pub. Date: Nov. 20, 2014

(65) Prior Publication Data
US 2016/0076632 A1   Mar. 17, 2016

(30) Foreign Application Priority Data
May 15, 2013   (DE) .................. 10 2013 008 311

(51) Int. Cl.
*F16H 1/24*   (2006.01)
*F16H 55/02*   (2006.01)
*F16H 25/22*   (2006.01)

(52) U.S. Cl.
CPC ................. *F16H 25/2214* (2013.01)

(58) Field of Classification Search
CPC .................. F16H 25/2214; F16H 2025/2481; F16H 25/2223; F16H 25/2204
(Continued)

(56) References Cited

U.S. PATENT DOCUMENTS 3,667,311 A * 6/1972 Wysong .............. F16H 25/2223
 74/424.75
5,142,929 A * 9/1992 Simpson, III ....... F16H 25/2214
 74/424.87

(Continued)

FOREIGN PATENT DOCUMENTS

DE   4229583   3/1994
DE   19749137  6/1998
(Continued)

*Primary Examiner* — William Kelleher
*Assistant Examiner* — Jake Cook
(74) *Attorney, Agent, or Firm* — Volpe and Koenig, P.C.

(57) ABSTRACT

The invention relates to a ball screw (10) with a threaded spindle (12), a nut (14), rolling bodies (16) and at least one deflecting device (18, 20), wherein the threaded spindle (12) is displaceable by rotation, and wherein the deflecting device comprises an inner first body part (18) and an outer second body part (20), which body parts together form a deflecting channel (22), wherein the deflecting channel (22) has two tubular ends (24, 26) which are connected to each other via a transfer region (28), wherein the tubular ends (24, 26) of the deflecting channel are in each case formed by mutually complementary partial tubular sections (30, 32, 34, 36) of the body parts (18, 20), and wherein a sleeve (40) surrounding the nut (14) is provided, the deflecting device (18, 20) sits in an opening (42) in the nut (14), the deflecting device (18, 20) projects radially beyond the outer lateral surface of the nut (14) in a relaxed state when the sleeve (40) is absent and, in the presence of the sleeve (40), said sleeve exerts a radially inwardly directed force on the deflecting device (18, 20).

8 Claims, 5 Drawing Sheets

(58) Field of Classification Search
USPC .................................................... 74/424.86
See application file for complete search history.

(56) References Cited

U.S. PATENT DOCUMENTS

| | | | |
|---|---|---|---|
| 6,092,434 A | 7/2000 | Matsumoto et al. | |
| 2006/0169079 A1* | 8/2006 | Lee .................... | F16H 25/2233 74/424.82 |
| 2010/0206656 A1* | 8/2010 | Asakura .............. | F16H 25/2214 180/444 |
| 2010/0242653 A1 | 9/2010 | Adler et al. | |
| 2012/0304793 A1 | 12/2012 | Chen | |
| 2013/0068052 A1 | 3/2013 | Allegri | |

FOREIGN PATENT DOCUMENTS

| | | |
|---|---|---|
| DE | 10108641 | 9/2002 |
| DE | 102005007875 | 8/2006 |
| DE | 102007059718 | 6/2009 |
| DE | 202011001752 | 6/2011 |
| EP | 2221506 | 8/2010 |

\* cited by examiner

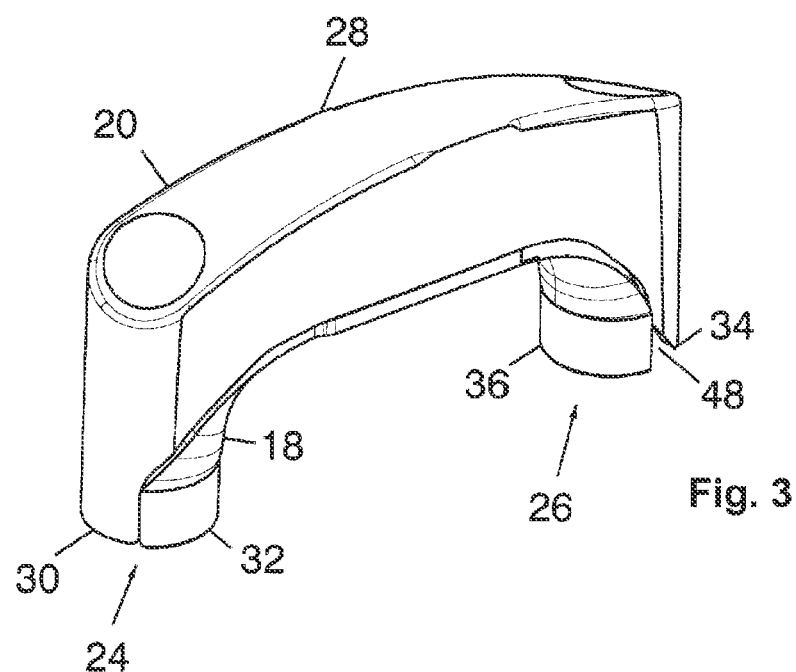
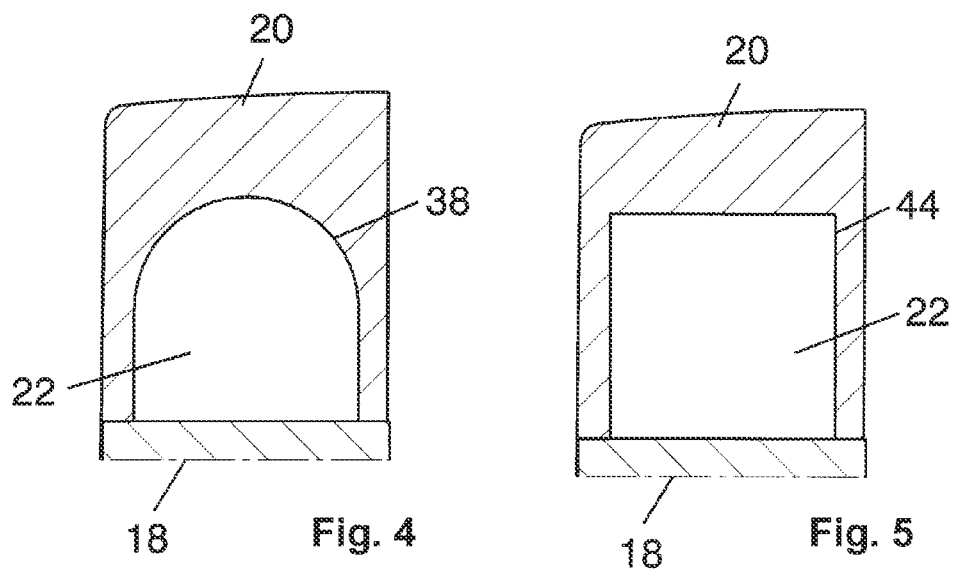

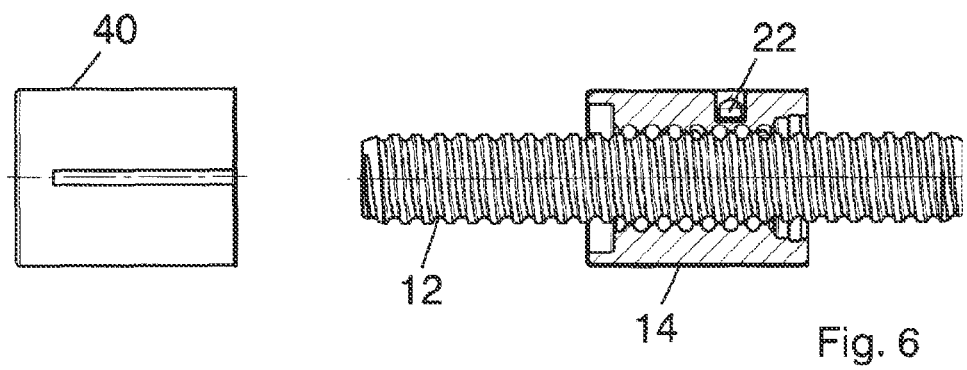

BALL SCREW

BACKGROUND

The invention relates to a ball screw comprising a threaded spindle, a nut, a plurality of rolling bodies and at least one deflection device.

Ball screws of this type are used to convert a rotational movement into a longitudinal movement, or vice versa. In the process, the ball screw functions with little friction, low wear, and potentially at high speeds and high positional accuracy. Great forces can also be transmitted by means of conventional ball screws, as occur, for example, in the motor vehicle sector in brakes, clutches or steering.

Since the balls or, in general terms, the rolling bodies of the screw drive constantly roll in the thread when said drive is being operated, said bodies need to be recirculated. For this purpose, a ball screw contains a deflection device which receives balls on one side and transports them through a channel to another point on the thread, from where said device releases them again.

EP 2 221 506 B1 discloses a ball screw, in which the deflection device is formed in two parts and is equipped with latching devices.

SUMMARY

An object of the invention is to provide a ball screw which is inexpensive to produce while still having high resistance to wear.

This object is achieved by the features of the independent claim.

Advantageous embodiments of the invention are provided in the dependent claims.

The invention relates to a ball screw comprising a threaded spindle, a nut, a plurality of rolling bodies and at least one deflection device, wherein the threaded spindle can be displaced relative to the nut in the axial direction by rotation relative to the nut and wherein the deflection device comprises a radially inner first body part and a radially outer second body part, which together form a deflection channel for the rolling bodies. wherein the deflection channel has two substantially tubular ends in the form of rolling body openings, which are interconnected via a transfer region, wherein the first body part in the transfer region provides a radially inner delimitation of the deflection channel, wherein the second body part in the transfer region provides a radially outer delimitation and side delimitations of the deflection channel, wherein the tubular ends of the deflection channel are each formed by complementary, partial-tube portions of the first body and of the second body, and wherein a sleeve which surrounds the nut is provided, the deflection device is positioned in an opening in the nut, the deflection device, when relieved of tension in the absence of the sleeve, protrudes radially beyond the outer lateral surface of the nut, and, when the sleeve is present, it exerts a radially inwardly directed force on the deflection device.

The above definition of the ball screw according to the invention indicates that the deflection channel has two "substantially" tubular ends in the form of rolling body openings. The word "substantially" is used to express that in this case, there is no need for a strictly tubular shape to the effect that there has to be a continuous uninterrupted outer surface along the periphery of the tube. In fact, a continuous tube outer surface should not be expected for the sole reason that it is in two parts. Furthermore, in addition to the tubular ends being in two parts as mentioned above, gaps can intentionally be provided in the tube periphery so as to make it easier to fit the body parts together. Since the two body parts abut one another over their entire length, reliable alignment of the body parts is ensured during operation, and therefore there is no need for any latching devices. This makes it simple to both assemble the ball screw according to the invention and to carry out any potential necessary maintenance or repair work in the region of the deflection device. The deflection device is pressed into the nut by the sleeve so as to be immovable, and therefore it is anticipated that the components will not be displaced relative to one another during operation of the ball screw. The advantage of this is that the rolling bodies always delineate a precisely defined path. This precise path of the rolling bodies through the deflection channel can also be achieved, for example, if the bodies parts of the deflection device are provided with latching devices, as is the case in the prior art. In the embodiment currently being defined, however, this is not necessary; said latching devices would in fact be an obstruction since the sleeve presses the deflection device in the nut into its optimum position relative to the nut, the two body parts of the deflection device also assuming their optimum position relative to one another.

It may advantageously be provided that the partial-tube portions of both the first body part and the second body part are in the shape of a half tube at least at one end of the deflection channel. As a result, there is a sufficient amount of material in the end regions of the two body parts in order to provide sufficient strength in the region for receiving the rolling bodies.

It can also be provided for the two body parts to have the same radial length at least at one end of the deflection channel.

According to a preferred embodiment, the ball screw is designed such that the second body part in the transfer region provides a U-shaped delimitation of the deflection channel. A U-shaped delimitation of the deflection channel is advantageous in that the rolling bodies can then roll in a linear manner on the delimitation over the entire range of the delimitation, as long as the radii of the rolling bodies and the radii of the delimitation are adapted to one another appropriately. However, other delimitations are also conceivable, for example a delimitation having an angular cross section, in particular a rectangular cross section, or the like.

With regard to cost-effective production of the ball screw, it is provided for the first body to be a deep-drawn, punched or stamped part.

Therefore, the ball screw is also advantageously developed such that the second body part is a punched or stamped part.

It is particularly advantageous that the radial force of the sleeve onto the deflection device presses the second body part onto the first body part at least in a temperature range of between −50 and +150° C.

According to a further preferred embodiment of the ball screw according to the invention, a plurality of interconnected deflection devices are intended to be provided, the respective first body parts and/or the respective second body parts being interconnected. By using a plurality of deflection devices, the individual deflection device can be built to be smaller since said device only has to bridge fewer threads of the nut. As a result, the deflection angle of the rolling bodies when entering the deflection device can be selected to be smaller, and this reduces wear and noise generation.

BRIEF DESCRIPTION OF THE INVENTION

The invention will now be explained by way of example on the basis of embodiments with reference to the accompanying drawings, in which FIG. 1 is a perspective view of a ball screw, with some parts in an exploded view;

FIG. 3 is a perspective view of a deflection device;

FIG. 4 is a section through a first embodiment of a deflection device;

FIG. 5 is a section through a second embodiment of a deflection device;

FIG. 6 is a partially sectional side view of a deflection device;

DETAILED DESCRIPTION OF THE PREFERRED EMBODIMENTS

Figure 1:
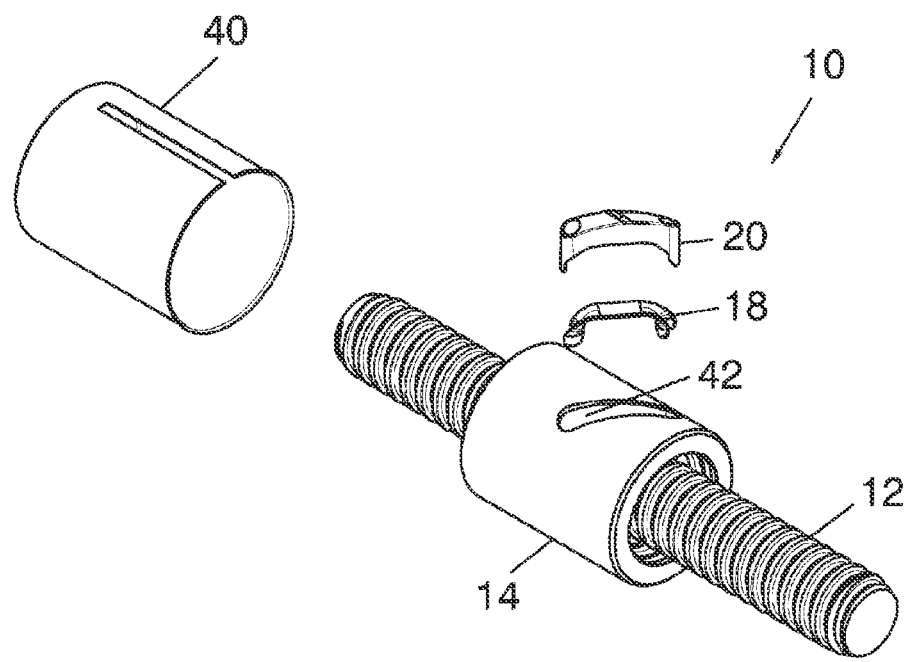

In the following description of the figures, like reference numerals denote like or similar components.

FIG. 1 is a perspective view of a ball screw 10, with some parts in an exploded view. The ball screw 10 comprises a threaded spindle 12 having an external thread, and a nut 14 having an internal thread. The threads interact by means of rolling bodies (not visible in FIG. 1), so that when the threaded spindle 12 rotates relative to the nut 14 with little friction, the rotational movement is converted into a translational movement of the nut 14 relative to the threaded spindle 12. Since the rolling bodies constantly roll in the threads when the threaded spindle 12 and the nut 14 move relative to one another, the rolling bodies have to be recirculated. For this purpose, an opening 42, which is produced for example as a milled portion, is provided in the nut 14. A deflection device which consists of a first body part 18 and a second body part 20 and transports the rolling bodies from one thread of the nut 14 to another in the event of relative movement can be inserted into this opening 42. When the body parts 18, 20 of the deflection device are inserted into the opening 42 in the nut 14, a sleeve 40 is pushed over the nut so that the deflection device is then captive.

Figure 2:
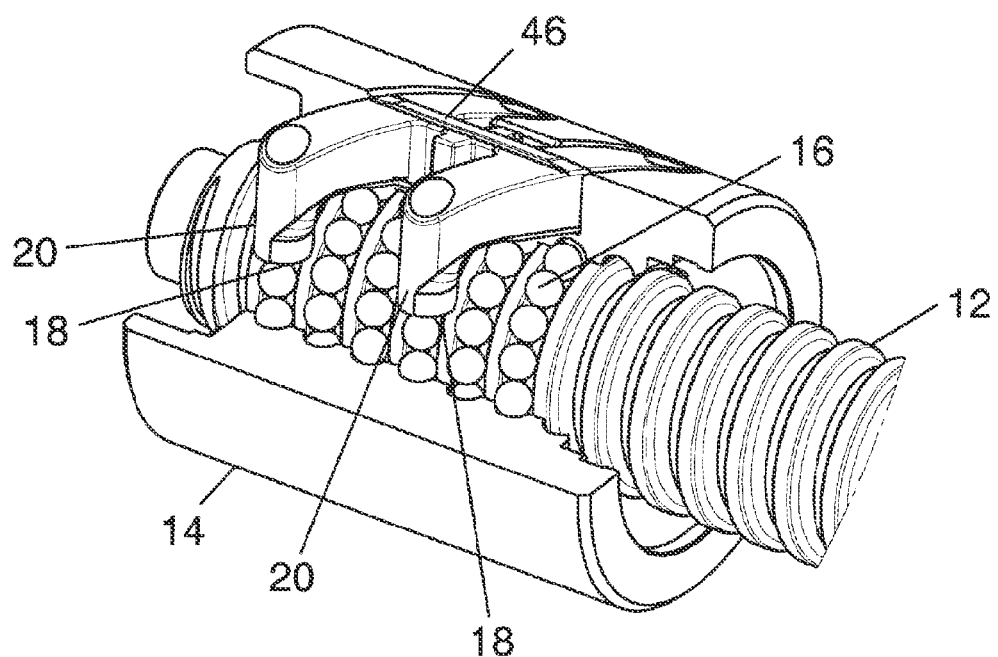
FIG. 2 is a perspective, partially sectional view of a ball screw.

FIG. 2 is a perspective, partially sectional view of a ball screw 10. In this figure, the rolling bodies 16 designed as balls can also be seen. In the present embodiment, two deflection devices 18, 20 are provided and interconnected. If the threaded spindle 12 rotates in a clockwise manner relative to the nut 14, the balls are received by the deflection devices 18, 20 at the ends (visible in this case) and then recirculated diagonally via a plurality of threads in order to be released again at the other ends of the deflection devices 18, 20. If the threaded spindle 12 rotates relative to the nut 14 in the opposite direction, the respective roles of the ends of the deflection devices are reversed. Since the deflection bodies 18, 20 and/or the connecting piece 46, which interconnects the deflection bodies 18, 20, protrude slightly beyond the periphery of the nut 14, a pressure is exerted onto the deflection bodies 18, 20 in the radial direction by pushing thereon the sleeve 40 shown in FIG. 1, and this pressure causes the deflection bodies to be rigidly and securely positioned and to be so over a wide temperature range, preferably of from −50 to +150° C. Ball screws can be made of various materials, for example metal, plastics material or ceramics. Material mixtures can also be used.

FIG. 3 is a perspective view of a deflection device 18, 20. The deflection device 18, 20 has two tubular ends 24, 26. A transfer region 28 is provided between the tubular ends 24, 26. The end 24 is formed by two partial-tube portions 30, 32, one of the partial-tube portions 32 being part of the first body part 18 while the other partial-tube portion 30 is a component of the second body part 20. The second end 26 is also formed from both the partial-tube portion 36 of the first body part 18 and the partial-tube portion 34 of the second body part 20. All or some of the partial-tube portions can for example be in the shape of a half tube. Overall, it is essential for the ends of the deflection device to delineate a substantially tubular contour, it of course being possible for there to be discontinuous transitions between the body parts 18, 20 or even deliberate gaps 48 between the body parts 18, 20. Gaps of this type can be used to freely compensate for stresses in the end region of the deflection device 18, 20 that are produced in particular when the deflection device 18, 20 is pressed into the nut.

FIG. 4 is a section through a first embodiment of a deflection device 18, 20. FIG. 5 is a section through a second embodiment of a deflection device 18, 20. These are two examples of the delimitations of the deflection channels 22, which delimitations are provided by the radially outer second body part 20. The deflection channels 22 are formed by delimitations of the body parts 18, 20 of the deflection devices. In the example according to FIG. 4, the delimitation 38 is U-shaped, whilst the delimitation 44 in the example in FIG. 5 is rectangular. Mixed shapes of the shown delimitation contours are conceivable, or even any other form of delimitation. It can be seen in FIGS. 4 and 5 that the lower body part 18 provides a respective radially inner delimitation, whilst the upper body part 20 provides a respective radially outer delimitation and side delimitations.

FIG. 6 is a partially sectional side view of a deflection device 18, 20. In this figure, the position of the deflection channel 22 relative to both the nut 14 and the threaded spindle 12 can be seen.

Figure 7:
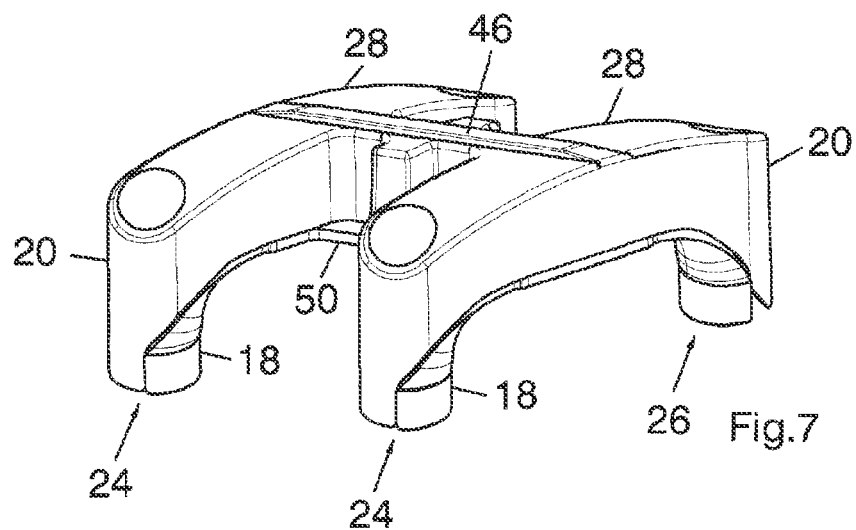
FIG. 7 is a perspective view of two interconnected deflection devices.
Figure 8:
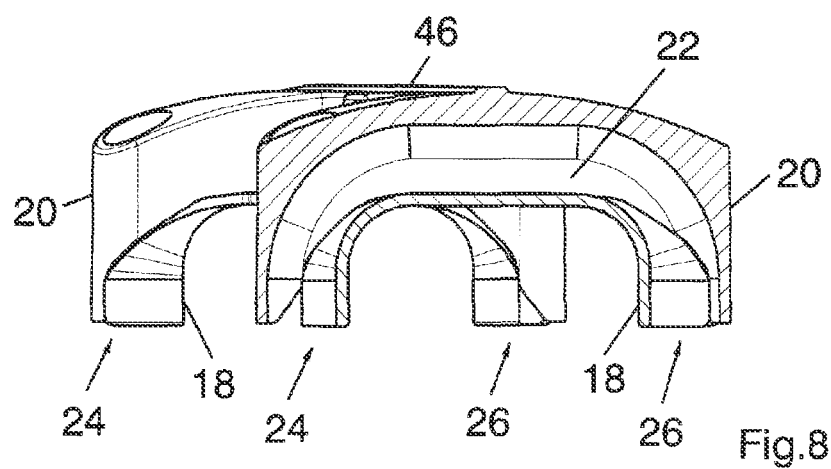
FIG. 8 is a partially sectional side view of two interconnected deflection devices.
Figure 9:
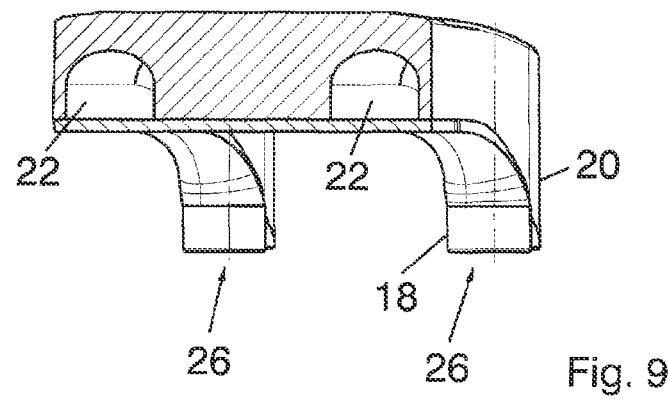
FIG. 9 is a partially sectional, perspective view of two interconnected deflection devices.

FIG. 7 is a perspective view of two interconnected deflection devices 18, 20. FIG. 8 is a partially sectional side view of two interconnected deflection devices 18, 20. FIG. 9 is a partially sectional perspective view of two interconnected deflection devices 18, 20. These figures again show apparatuses which comprise two deflection devices 18, 20 having respective ends 24, 26 and transfer regions 28. The deflection devices 18, 20 are interconnected by means of connecting pieces 46, 50, a radially outer connecting piece 46 interconnecting the radially outer body parts 20 and a radially inner connecting piece 50 coupling the radially inner body parts 18 of the respective deflection devices 18, 20. In FIG. 8, a deflection channel 22 can be seen in a longitudinal section. In FIG. 9, two deflection channels 22 are shown in an oblique cross section.

The features of the invention as disclosed in the above description, in the drawings and in the claims can be essential for the implementation of the invention both in isolation and in any given combination.

LIST OF REFERENCE NUMERALS

10 Ball screw
12 Threaded spindle
14 Nut
16 Rolling body
18 Deflection device, first body part
20 Deflection device, second body part
22 Deflection channel
24 Tubular end
26 Tubular end 28 Transfer region
30 Partial-tube portion
32 Partial-tube portion
34 Partial-tube portion
36 Partial-tube portion
38 U-shaped delimitation
40 Sleeve
42 Opening
44 Angular delimitation
46 Connecting piece
48 Gap
50 Connecting piece

The invention claimed is:

1. A ball screw (10) comprising a threaded spindle (12), a nut (14), a plurality of rolling bodies (16) and at least one deflection device (18, 20), wherein the threaded spindle (12) is displaceable relative to the nut (14) in an axial direction by rotation relative to the nut (14), and the deflection device comprises a radially inner first body part (18) and a radially outer second body part (20), which together form a deflection channel (22) for the rolling bodies, the deflection channel (22) has two substantially tubular ends (24, 26) that form rolling body openings, which are interconnected via a transfer region (28), the first body part (18) in the transfer region (28) provides a radially inner delimitation of the deflection channel (22), the second body part (20) in the transfer region (28) provides a radially outer delimitation and side delimitations of the deflection channel (22), the tubular ends (24, 26) of the deflection channel are each formed by complementary, partial-tube portions (30, 32, 34, 36) of both the first body (18) and the second body (20), and a sleeve (40) which surrounds the nut (14) is provided, the deflection device (18, 20) is positioned in an opening (42) in the nut (14), the deflection device (18, 20), when relieved of tension in the absence of the sleeve (40), protrudes radially beyond an outer lateral surface of the nut (14), and, when the sleeve (40) is present, it exerts a radially inwardly directed force on the deflection device (18, 20).

2. The ball screw (10) according to claim 1, wherein the partial-tube portions (30, 32, 34, 36) of both the first body part (18) and the second body part (20) are each shaped as a half tube at least at one end of the deflection channel (22).

3. The ball screw (10) according to claim 1, wherein the two body parts (18, 20) have a same radial length at least at one end of the deflection channel (22).

4. The ball screw (10) according to claim 1, wherein the second body part (20) in the transfer region (28) provides a U-shaped delimitation (38) of the deflection channel (22).

5. The ball screw (10) according to claim 1, wherein the first body part (18) is a deep-drawn, punched, or stamped part.

6. The ball screw (10) according to claim 1, wherein the second body part (20) is a punched or stamped part.

7. The ball screw (10) according to claim 1, wherein the radial force of the sleeve (40) onto the deflection device (18, 20) presses the second body part (20) onto the first body part (18) at least in a temperature range of between −50 and +150° C.

8. The ball screw according to claim 1, wherein a plurality of interconnected deflection devices are provided, and at least one of the respective first body parts (18) or the respective second body parts (20) are interconnected.

* * * * *